Dec. 30, 1930. W. GOWAN 1,786,990
MOTOR VEHICLE BODY
Filed Sept. 12, 1928 2 Sheets-Sheet 1

Inventor.
William Gowan,

Dec. 30, 1930. W. GOWAN 1,786,990
MOTOR VEHICLE BODY
Filed Sept. 12, 1928 2 Sheets-Sheet 2

Inventor.
William Gowan

Patented Dec. 30, 1930

1,786,990

UNITED STATES PATENT OFFICE

WILLIAM GOWAN, OF FOLKESTONE, ENGLAND, ASSIGNOR TO THE CAPE BODY LIMITED, OF LONDON, ENGLAND, A BRITISH COMPANY

MOTOR-VEHICLE BODY

Application filed September 12, 1928, Serial No. 305,356, and in Great Britain September 26, 1927.

This invention relates to an improved motor vehicle body of the kind having a compartment for passengers and in which the driver is located in front of the said compartment.

It has been proposed in a body of this type to arrange sliding doors at the front of the latter, which construction has the disadvantage, however, that entry, to and exit from, the vehicle can only be obtained through the portion of the front wall of the compartment which is not obstructed by the driver's seat and the object of my invention is to provide a construction whereby entry to, and exit from, the compartment can be obtained also from the portion of the said wall that is obstructed by the driver's seat.

To this end, according to the invention, the front wall of the passenger compartment comprises two doors slidable one behind the other to permit of access to the compartment from either side of the center line of the vehicle.

In a suitable construction, according to the invention, the relatively movable doors, which are preferably curved or bowed outwardly, are designed to run in a groove or on rails or trolleys arranged on the floor and roof of the vehicle so that the said doors may slide one behind the other and the vehicle may be provided with movable or sliding windows at front, sides and back. The roof of the vehicle is supported by pillars or stanchions and is preferably made curved or dome-shaped and is designed to extend beyond and to overhang the sliding doors and means may be provided to cover the space above the driver, between the front of the roof and the wind-screen or an upper pivoted or sliding extension thereof so that the driver is protected against the weather.

In order that the invention may be fully understood the same will now be described with reference to the accompanying drawing, in which:—

$a$ is the chassis of the motor vehicle having the improved body mounted thereon. The said body is provided with a passenger compartment $b$ arranged in rear of, and separate from the driver's seat $c$. The compartment $b$ comprises sides $d$, which extend along the rear portion of the chassis of the vehicle, side pillars or stanchions $e$ to which the front edges of the said sides are connected, a centre pillar $f$, a back $g$, and a roof $h$ which extends from the back $g$ over the seat $c$ and is supported by the said pillars $e$ and $f$.

The front of the compartment $b$ is curved and closed by two curved doors $i$, $i^1$ arranged to slide between two sets of guide rails $j$, $k$, the rails $j$ projecting from the roof of the vehicle and the rails $k$ being sunk in the floor thereof. The doors $i$, $i^1$ which are curved outwardly are capable of sliding one behind the other so that access can be obtained to the interior of the compartment $b$ from either side of the centre line of the vehicle, and the curved formation of the doors gives the maximum amount of space inside the compartment compatible with the necessary space required for access to the doors from the outside. In the closed position, the outer edges of the doors bear against the pillars $e$ to which the said doors may be locked in the usual manner through the medium of handles 1.

Figure 1:
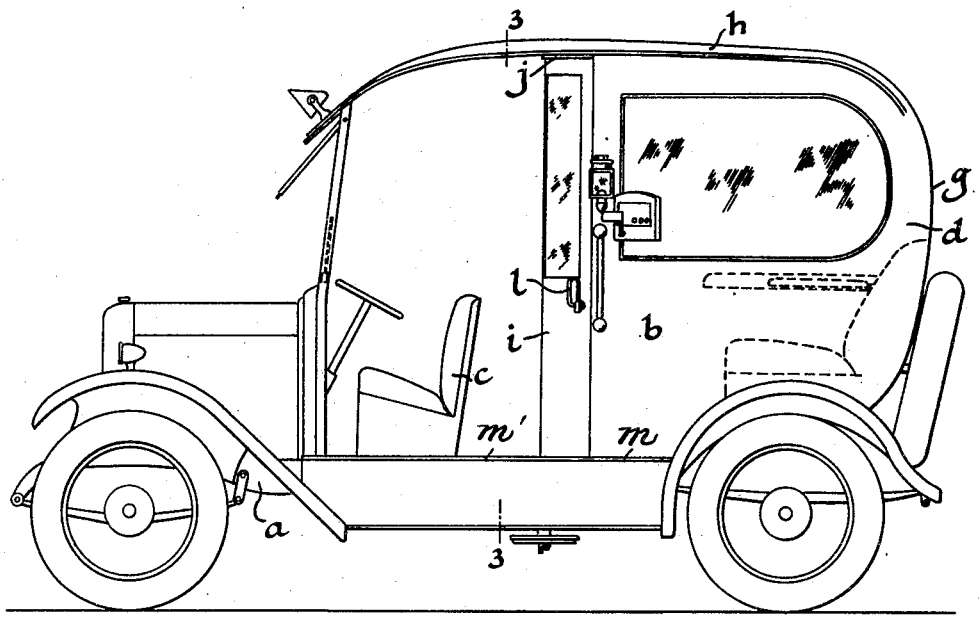
Figure 1 is an elevation of the improved motor vehicle body applied to a chassis and constructed in accordance with the invention.
Figure 2:
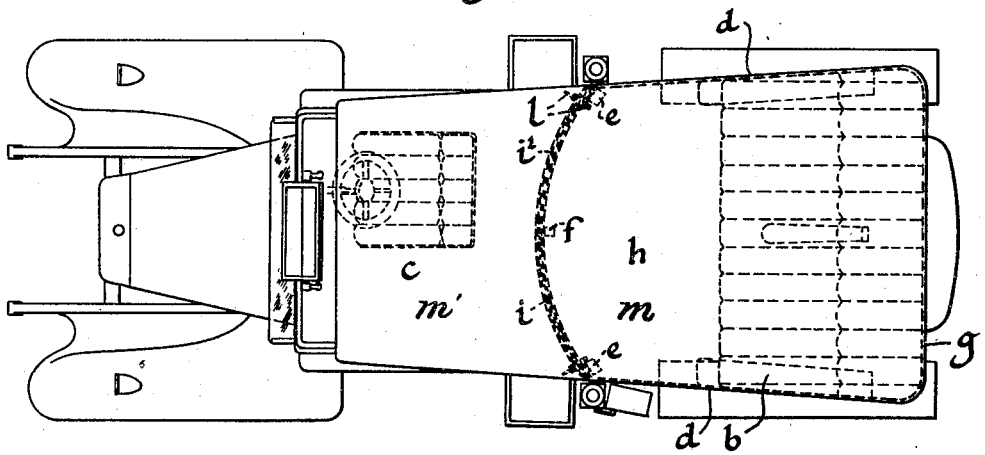
Figure 2 is a plan view thereof.
Figure 3:
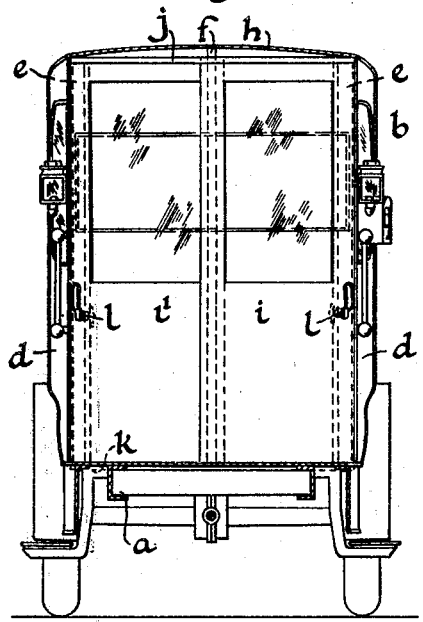
Figure 3 is a section on the line 3—3, Figure 1.
Figure 4:
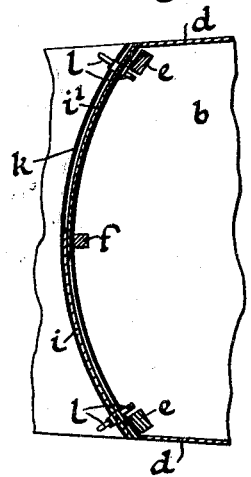
Figure 4 is a sectional plan view of the doors drawn to a larger scale than the preceding figures.

As will be readily apparent from the drawings, Figs. 1 and 2, the floor of the body provides a portion, $m$, within the confines of the passenger compartment, and a portion, $m'$, extending forwardly of the doors, $i$, $i$, substantially level with the portion, $m$, on which the driver's seat, $c$, is located. The driver's seat is arranged as shown, in such a position as to permit a passenger to step upon the floor portion, $m'$, at either side of the vehicle, and therefore a passenger may open either door, by sliding it laterally to enter or leave the passenger compartment, the doors being of sufficient height above the floor portions to permit the entrance and exit of the passengers.

In order to give ample head room to persons entering and leaving the compartment $b$, the roof $h$ is curved or dome-shaped in such a manner that the height thereof is greatest at the portion passing over the sliding doors $i, i^1$.

It will be observed that, with this construction of vehicle body, the sides $d$ are relatively shorter than the corresponding sides of a motor vehicle body of usual construction in which doors are provided in the said sides. Consequently in the improved construction there is more space available for passengers' luggage (which may be disposed on the floor of the vehicle in front of the sliding doors) than was hitherto provided.

A further advantage of the invention resides in the fact that relatively large windows may be provided in the sides and back of the passenger compartment, there being no pillars disposed in the middle of the said sides which would be necessitated if doors were provided therein.

A still further advantage of the invention resides in the fact that communication may be conveniently established between the driver of the vehicle and a passenger in the compartment as the door in rear of the driver's seat may be opened without danger even while the vehicle is moving.

Claims—

1. A motor vehicle body having a closed passenger compartment, provided at its forward end with laterally sliding doors, adapted to slide one behind the other, said body having a floor portion extending forward of said doors, and substantially level with the floor portion of the passenger compartment, and a driver's seat located on said forwardly extending floor portion out of the way of the apertures provided by the opening of said doors to leave an unobstructed passageway to either side of said vehicle, and said doors being of sufficient height above said floor portions to enable a passenger to step upon the said forwardly extending floor portion at either side of the vehicle and to enter or leave the passenger compartment through either door opening.

2. A motor vehicle body having a closed passenger compartment, a floor portion within the same, and a forwardly extending floor portion on substantially the same level, a pair of laterally sliding doors forming the front wall of the passenger compartment, transversely disposed guiding means on the floor and the roof of the passenger compartment for guiding said doors and permitting them to slide past each other, and a driver's seat located on the forwardly extending floor portion at a distance forward of the doors to provide an unobstructed passageway to either side of said vehicle, permitting a passenger to step on said floor portion in entering or leaving the vehicle through the aperture provided by opening either door.

3. A motor vehicle body having a closed passenger compartment, provided at its forward end with laterally sliding doors, adapted to slide one behind the other, said body having a floor portion extending forward of said doors, and substantially level with the floor portion of the passenger compartment, and a driver's seat located on said forwardly extending floor portion out of the way of the apertures provided by the opening of said doors to provide an unobstructed passageway to either side of said vehicle, and said doors being of sufficient height above said floor portions to enable a passenger to step into said passageway and upon the said forwardly extending floor portion at either side of the vehicle and to enter or leave the passenger compartment through either door opening, the roof of the passenger compartment having its greatest height above said doors, and sloping downwardly and rearwardly therefrom.

4. A motor vehicle body having a closed passenger compartment, provided at its forward end with laterally sliding doors, adapted to slide one behind the other, said body having a floor portion extending forward of said doors, and substantially level with the floor portion of the passenger compartment, and a driver's seat located on said forwardly extending floor portion out of the way of the apertures provided by the opening of said doors to provide an unobstructed passageway to either side of said vehicle, and said doors being of sufficient height above said floor portions to enable a passenger to step into said passageway and upon the said forwardly extending floor portion at either side of the vehicle and to enter or leave the passenger compartment through either door opening, the roof of the vehicle extending over the passenger compartment and over the driver's seat, said roof having its greatest height above said doors and sloping downward forwardly and also rearwardly from said part of greatest height.

5. A motor vehicle body, having a closed passenger compartment, provided at its forward end with doors slidable within the lateral confines of the vehicle to expose an opening at either side on the front of the vehicle, said body having a floor portion extending forwardly from said doors, and a driver's seat located on said forwardly extending floor portion, and spaced a sufficient distance beyond the doors to provide an unobstructed passageway extending completely across the vehicle.

WILLIAM GOWAN.